(Model.)

W. & C. S. ROBB.
FRUIT PARING MACHINE.

No. 313,532. 3 Sheets—Sheet 1.

Patented Mar. 10, 1885.

Witnesses:
S. R. Richards.
James Henry

Inventors:
Wm. Robb and
Chas. S. Robb.
By W. B. Richards
their atty.

N. PETERS, Photo-Lithographer, Washington, D. C.

(Model.)
W. & C. S. ROBB.
FRUIT PARING MACHINE.
No. 313,532. Patented Mar. 10, 1885.
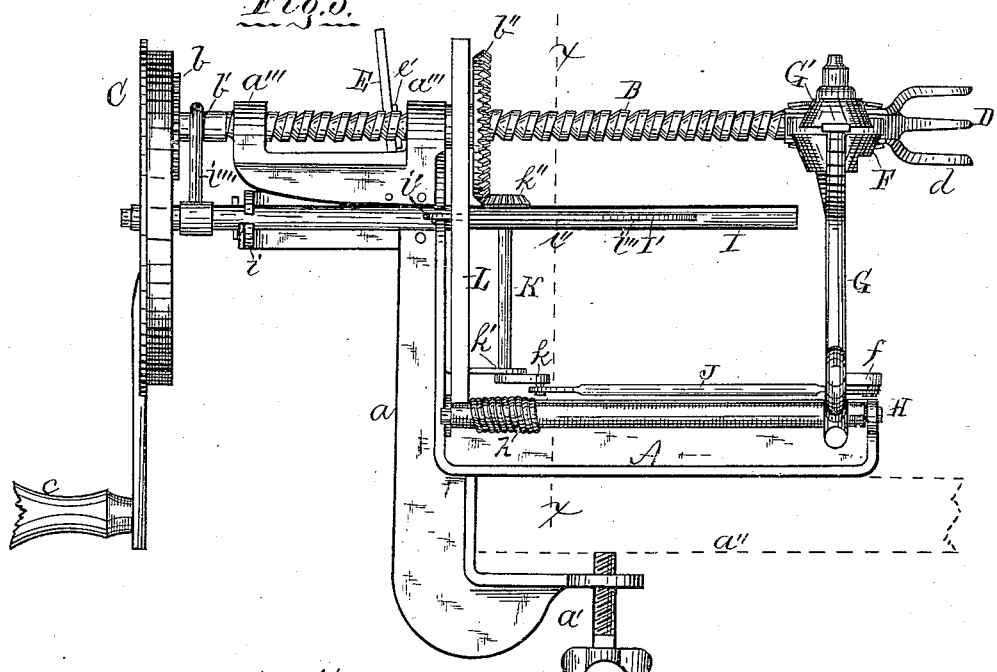
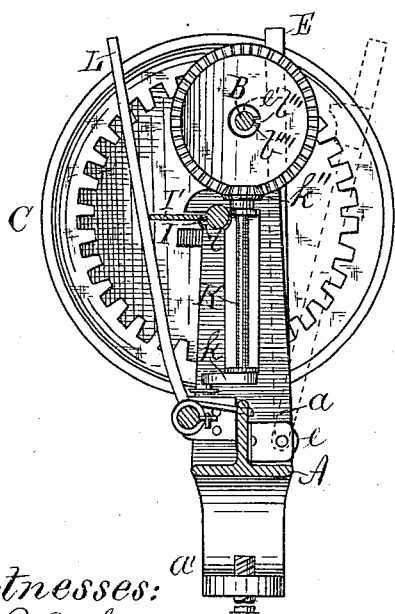
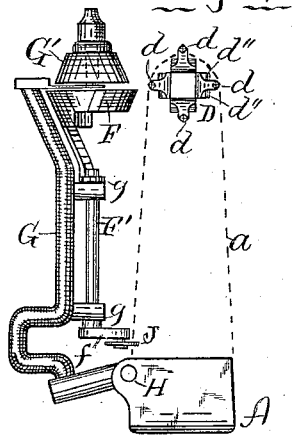
Witnesses:
S. R. Richards
James Henry
Inventors:
Wm. Robb and
Chas. S. Robb
By W. B. Richards,
their Atty.

(Model.) 3 Sheets—Sheet 3.
W. & C. S. ROBB.
FRUIT PARING MACHINE.
No. 313,532. Patented Mar. 10, 1885.
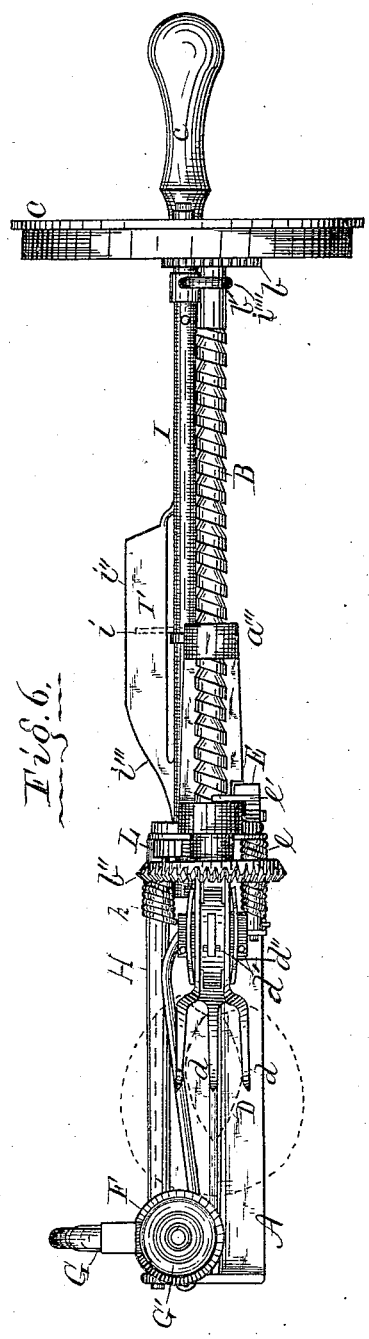
Witnesses:
P. R. Richards.
James Henry
Inventors:
Wm. Robb and
Chas. S. Robb,
By W. B. Richards,
their Atty.

UNITED STATES PATENT OFFICE.

WILLIAM ROBB, OF CONKLINGVILLE, NEW YORK, AND CHARLES S. ROBB, OF BOSTON, MASSACHUSETTS.

FRUIT-PARING MACHINE.

SPECIFICATION forming part of Letters Patent No. 313,532, dated March 10, 1885.

Application filed July 23, 1883. (Model.)

*To all whom it may concern:*

Be it known that we, WILLIAM ROBB and CHARLES S. ROBB, citizens of the United States, residing, WILLIAM ROBB at Conklingville, county of Saratoga, State of New York, and CHARLES S. ROBB at Boston, in the county of Suffolk and State of Massachusetts, have invented certain new and useful Improvements in Fruit-Paring Machines; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to fruit-paring machines of that class in which the paring-knife has a circular motion on its axis, in addition to its motion around one side of the apple or other class of fruit being pared; and the invention consists in the adaptation of this class of paring-knife to that class of fruit-parers in which the fruit-paring fork is moved by a screw-threaded shaft past a paring-knife, which is secured to a spring-arm that permits the knife to yield, and at the same time holds it in contact with the fruit being pared.

The invention further consists in a cam which moves with the fork-carrying shaft and is adapted to swing the knife-carrying arm backward, to prevent the knife coming in contact with the fork.

The invention further consists in constructions and combinations hereinafter described.

In the accompanying drawings, which illustrate our invention, and in which the several letters used as marks of reference apply to the like parts in all the figures—

Figure 1:
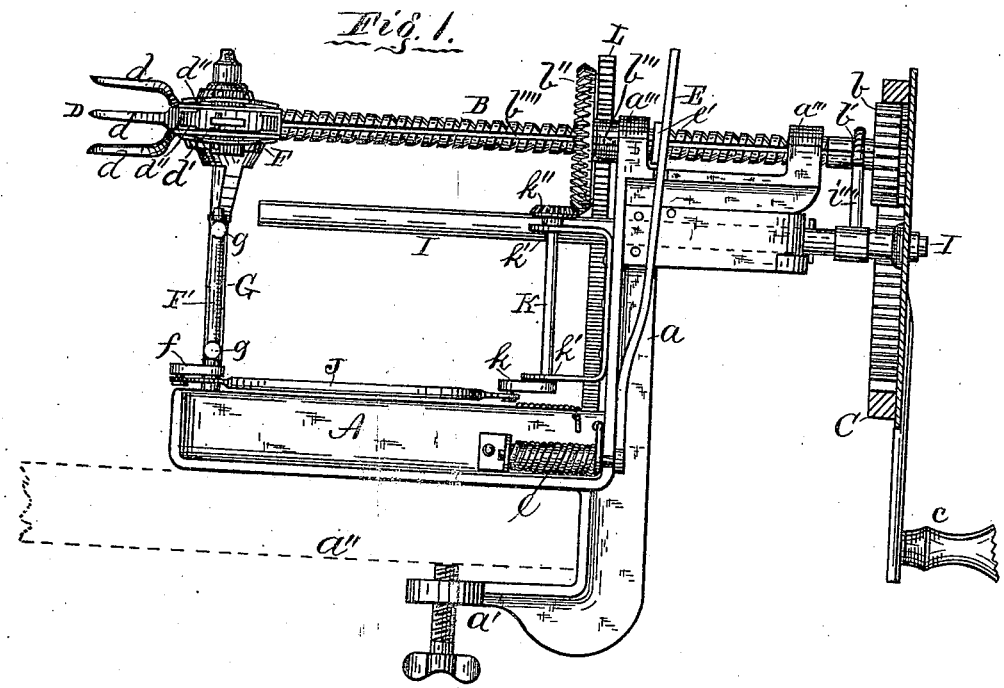
Figure 2:
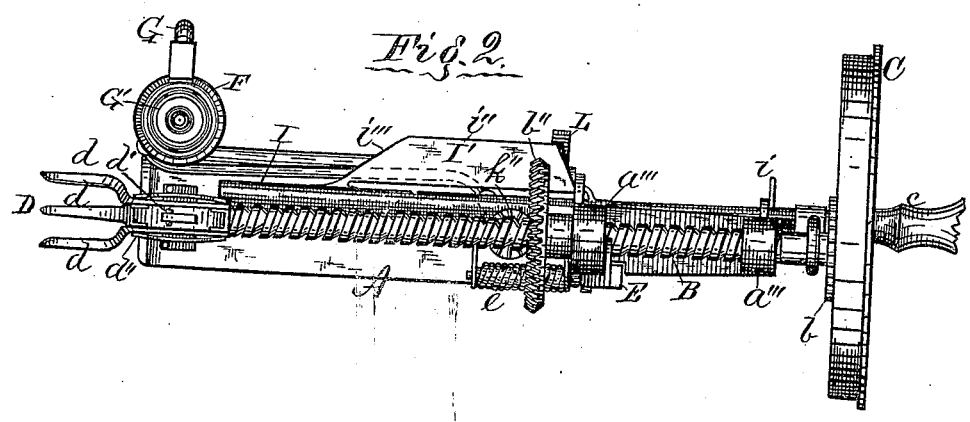

Figure 1 is a side elevation. Fig. 2 is a top plan. Fig. 3 is a side elevation, showing the opposite side of the parer from the side shown at Fig. 1. Fig. 4 is a sectional elevation on line $x\ x$ in Fig. 3. Fig. 5 is an end elevation. Fig. 6 is a top plan, showing the parts in different relative positions from Fig. 2.

The construction and relative arrangement of the parts of the improvement and the adjacent parts of the general machine in which said improvements may be incorporated are as follows:

Letter A represents the base of the frame, with a standard, $a$, and a clamp, $a'$, by means of which clamp it may be attached to any suitable device, $a''$. The standard $a$ has bearings $a'''\ a'''$ at its upper end, through which a screw-threaded shaft, B, loosely passes, so that it may slide endwise in said bearings.

C is the drive-wheel, geared by an internal gear with the pinion $b$ on the end of the shaft B, and provided with a crank, $c$.

D is the fork formed of prongs $d$, held by keys $d'$ and spring-plates $d''$, which springs permit the prongs to yield outwardly for embracing the seed of peaches and retaining peaches on a fork, which fruit the parer is designed more especially to operate on.

E is an arm secured to a spring-actuated shaft, $e$, and provided with a segment of a nut-thread, $e'$, which is held in contact with the screw on the shaft B by the spring-actuated shaft $e$, and may be swung back to release it from and permit drawing the shaft B endwise without rotation thereof.

F is a paring-knife, formed of a truncated conical ring sharpened at its base, which base is, as it stands, the upper side. The knife F is connected with a knife-arm, G, as hereinafter described.

G' is a guard attached to the arm G above the knife F. The arm G is connected at its lower end with a shaft, H, which has a spring, $h$, for pressing the knife toward the fruit, and which permits the arm G with the knife to yield backward away from the fruit.

The foregoing parts described by letter are parts of an ordinary paring-machine of the class hereinbefore referred to, and may be formed and arranged as shown, or in any other desired manner which will permit of adapting my invention thereto, substantially as hereinafter described.

I is a rod adapted to slide or reciprocate endwise in bearings $i\ i'$ on the standard $a$.

The rod I has a cam-plate, I', fixed to its side, which cam-plate has a side, $i''$, parallel with the shaft I, and has a sloping end, $i'''$. The rod I is made to move endwise simultaneously with the fork-shaft by means of an arm, $i''''$, one end of which is fixed to the rod I and the other of which has an eye or hook encircling the fork-shaft in a groove, $b'$, therein. The drive-wheel C in ordinary parers of this class is carried on the end of the shaft B, or in gear with said shaft, and journaled to a fixed part of the frame. In this invention the drive-wheel is journaled on the end of the slide-rod I and is geared with the shaft B, as hereinafter described, so that while the rotary motion of the drive-wheel moves the shaft B endwise such endwise movement of said shaft carries with it the rod I and the drive-wheel. The knife F is fixed to the upper end of a shaft, F', which has bearings $g\ g$ on the arm G.

$f$ is a crank-arm on the lower end of the shaft F'.

J is a connecting-rod between the crank-arm $f$ and a similar crank-arm, $k$, on the lower end of a shaft, K, which has bearings $k'$ on the standard $a$, and has a pinion, $k''$, on its upper end. The pinion $k''$ gears with a bevel gear-wheel, $b''$, on the shaft B. The bevel gear-wheel $b''$ is loosely placed on the shaft B, so that said shaft may slide endwise through said pinion, and is held in rotation with the shaft by means of a pin, $b'''$, fixed in the hub or boss of the bevel gear-wheel, with its inner end resting in a groove, $b''''$, which is lengthwise of the shaft B. The bevel gear-wheel $b''$ is held from moving endwise with the shaft B by the standard $a$ on one side of it and the pinion $k''$ at its other side.

L is an arm fixed to and projecting upward from the spring-shaft H in close proximity to the cam I'. As the fork-shaft and rod I slide endwise the face $i''$ of the cam I' comes in contact with the arm L and presses it backward and with it the knife-arm and knife, so as to hold the knife from coming in contact with the fork or the fork-shaft while these parts are in front of the knife, as shown at Figs. 2, 4, and 5. When the fork-shaft is drawn back, so as to bring the fork back past the knife, the cam I' will be drawn away from the arm L and the knife-arm be permitted thereby to swing inward and bring the knife in front of the fork or in the line of its path, as shown at Fig. 6. When the cam I' advances from the position shown at Fig. 6, its point, formed by its sloping side $i'''$, passes again beneath the arm L, and the cam then again acts as hereinbefore described.

In operation the peach or other fruit is placed on the fork while the fork is projected past the knife, as shown at Figs. 1, 2, and 3. The screw-thread on the shaft B is left handed; hence, by turning the drive-wheel to the right hand, or as clock-hands go, the shaft B will be retracted and move the peach along past the knife, which knife will yield backward and pass around the fruit to pare it in the ordinary manner, and as the knife so moves it will further be given an oscillating movement on its axis by means of the bevel gear-wheel $b''$ and pinion $k''$, shafts F' K, and connecting-rod J, which connects the cranks $f\ k$. This oscillating motion of the knife will facilitate its operation in paring, especially in paring soft or uneven or tough-skinned fruit. When one of the crank-arms $f$ or $k$ is shorter than the other, (as shown in the drawings,) from the axis of the respective shaft which carries it to the crank-pin to which the rod J is journaled than is the other crank-arm from its respective shaft to its crank-pin, then an oscillating motion, as hereinbefore described, will be given the paring-knife on the axis of shaft F'. By simply substituting crank-arms $f$ and $k$ with their crank-pins the same distances from the respective shafts, which carry said crank-arms in connection with another set of similar crank-arms, each crank-arm which is at right angles with the crank-arm $f$ or $k$ on the same shaft therewith and connected by a rod similar to the rod J, which connects the cranks $f$ and $k$, as shown, then a rotary motion will be given the paring-knife on the shaft F', as is done in the well-known coupling of locomotive-wheels. Another well-known method which can be employed is placing a third equal crank-arm in the plane of the cranks $f$ and $k$, and connecting it with them by links. (See Reuleaux' Kinematics of Machinery, page 190.) The same result can also be effected by simply substituting pulleys for the crank-arms $f$ and $k$, and connecting them by a belt. Thus it will be seen that this change from an oscillating to a rotary motion of the knife, and vice versa, in this class of fruit-parers, is effected without any substantial change in the devices, in fact is effected by common and well-known mechanical expedients.

By means of our cam for pressing the knife back as the fork passes, a knife can be used which will swing into the path of the fork when free from the cam, as shown at Fig. 6, so that it will pare the entire outer end of the fruit and not leave a circular spot unpared, as in ordinary parers of this class. When the paring is completed and the fork retracted, the fruit may be removed from the fork, the segment-nut drawn back, and the fork-shaft slid endwise into position for another operation. The bearings $i\ i'$ are slightly extended at their under sides, as shown, to form supports under the cam I' and prevent any tendency of the shaft I to rotate.

What we claim as new is—

1. In a fruit-paring machine, in combination with the reciprocating fork-shaft, the knife secured to a swinging spring-actuated knife-arm, and a sliding shaft adapted to be operated by the fork-shaft and provided with a cam, and an arm connected with the spring-actuated knife-arm shaft, on which arm said cam acts, substantially as and for the purpose specified.

2. In combination with the frame A, fork-shaft B, knife-arm secured to a spring-actuated shaft, arm L, projecting from said shaft, sliding rod I, with cam I', driving-wheel journaled on the rod I, and bar connecting the rod I and the fork-shaft, whereby they slide together, substantially as and for the purpose specified.

3. In combination with a knife secured to a swinging arm carried on a spring-actuated shaft, from which an arm, L, projects, a sliding cam adapted to swing the knife-arm rearward to permit the fruit-carrying fork to pass it, for the purpose specified.

4. In a fruit-paring machine, in combination with the frame A, screw-threaded fork-shaft having endwise movement, and the swinging knife-arm, a shaft, K, geared with the fork-carrying shaft and with the swinging knife-carrying arm, whereby an oscillating movement on its axis may be given to the knife, substantially as set forth.

5. In combination with the screw-threaded fork-carrying shaft, adapted to carry the impaled fruit past a yielding knife-carrying arm, a pinion carried on said shaft, a shaft, K, pinion k'', crank-arm k, connecting-rod J, and shaft F', carrying the paring-knife, and a crank-arm, f, substantially as and for the purpose specified.

6. In combination with the screw-threaded fork-carrying shaft and yielding knife-arm, a knife, means for oscillating the same, substantially as described, and the sliding rod I, provided with a cam, I', adapted to act on an arm, L, which projects from the shaft that carries the knife-arm, substantially as set forth.

7. In a fruit-paring machine of the general class herein described, in combination with the fork-carrying shaft having a pinion on its outer end, and with a cam carrying sliding rod, I, adapted to act on an arm projecting from the same shaft which carries the knife-arm, the drive-wheel journaled on the sliding rod I and geared with the pinion on the fork-shaft, substantially as described.

In testimony whereof we affix our signatures in presence of two witnesses.

WILLIAM ROBB.
CHARLES S. ROBB.

Witnesses for William Robb:
 AARON HALL,
 SARAH HALL.
Witnesses for Charles S. Robb:
 Q. E. RANKIN,
 W. K. RANKIN.